United States Patent
Moyes et al.

(10) Patent No.: US 7,065,688 B1
(45) Date of Patent: Jun. 20, 2006

(54) SIMULTANEOUS MULTIPROCESSOR MEMORY TESTING AND INITIALIZATION

(75) Inventors: William A. Moyes, Austin, TX (US); Michael V. Mattress, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 421 days.

(21) Appl. No.: 10/370,325

(22) Filed: Feb. 19, 2003

(51) Int. Cl.
*G11C 29/00* (2006.01)

(52) U.S. Cl. .......................... 714/718; 714/25; 706/42; 700/2

(58) Field of Classification Search ................ 714/718, 714/46, 42; 710/100; 709/201
See application file for complete search history.

(56) References Cited

U.S. PATENT DOCUMENTS

| | | | |
|---|---|---|---|
| 4,665,518 A * | 5/1987 | Champlin et al. .......... 370/222 |
| 4,870,704 A * | 9/1989 | Matelan et al. ............. 710/120 |
| 5,274,797 A * | 12/1993 | Barlow et al. ................. 714/46 |
| 5,329,579 A * | 7/1994 | Brunson ................... 379/88.26 |
| 5,673,388 A * | 9/1997 | Murthi et al. .................. 714/42 |
| 6,381,715 B1 * | 4/2002 | Bauman et al. ............. 714/718 |
| 2002/0010872 A1 * | 1/2002 | Van Doren et al. ......... 713/400 |
| 2003/0126508 A1 * | 7/2003 | Litt .............................. 714/39 |

* cited by examiner

*Primary Examiner*—Albert Decady
*Assistant Examiner*—John P. Trimmings
(74) *Attorney, Agent, or Firm*—Zagorin O'Brien Graham LLP

(57) ABSTRACT

In a system having a plurality of processing nodes, wherein each of the plurality of processing nodes has an assigned portion of system memory such that the assigned portion of system memory of each of the plurality of processing nodes is accessible by the plurality of processing nodes, a technique is presented that allows each of the plurality of processing nodes to perform a memory initialization and test of the processing node's assigned portion of system memory. One of the processing nodes can cause the others of the processing nodes to perform the memory initialization and test process or each processing node can automatically perform the memory initialization and test process.

18 Claims, 5 Drawing Sheets

SIMULTANEOUS MULTIPROCESSOR MEMORY TESTING AND INITIALIZATION

BACKGROUND

1. Field of the Invention

This invention relates to system boot and more particularly to memory initialization during system boot.

2. Description of the Related Art

Computing systems are information handling systems which are designed to give independent computing power to one or more users. Computing systems can be found in many forms including, for example, mainframes, minicomputers, workstations, servers, personal computers, internet terminals, notebooks and embedded systems. Personal computer (PC) systems include desk top, floor standing, or portable versions. A typical PC system is a microcomputer that includes a microprocessor, associated memory and control logic (typically on a system board) and a number of peripheral devices that provide input and/or output (I/O) for the system. PC system boards often receive expansion PC boards to increase the capabilities of the computer system and to connect to peripheral devices through an expansion bus. For example, various multimedia devices are commonly implemented as add-in cards in desktop and portable computers or as integrated circuits for installation on a system board.

Computing systems typically include a set of built-in software routines called the basic input/output system (BIOS). The BIOS is a software interface between the system hardware and the operating system software. The BIOS facilitates programmer and user interaction with the system hardware. Because the BIOS has qualities of software and hardware, it is often referred to as firmware. The BIOS is a set of instructions to the computer's microprocessor. The BIOS is commonly coded using, for example, assembly language, and stored onto a non-volatile memory such as a ROM (Read Only Memory) or a PROM (Programmable ROM) such as an EPROM (Erasable PROM), an EEPROM (Electrically Erasable PROM), a flash RAM (Random Access Memory) or any other type of memory appropriate for storing BIOS.

The BIOS controls several important functions of personal computer systems. For instance, the BIOS performs various functions at power up, including testing and initializing memory, inventorying and initializing the system, and testing the system. These functions at power up are referred to as "system boot" or "booting the system" and can occur every time the system powers up or is reset. The BIOS also controls keystroke interpretation, display of characters, and communication via the PC ports.

FIGS. 1A–1B illustrate exemplary prior art computing system architectures. FIG. 1A illustrates an exemplary prior art single processor computing system architecture 100. BIOS executes on processor 102, referred to as the boot strap processor, to boot the computing system. Processor 102 can be any type of processor with any architecture, for example, a single scalar, a superscalar or a VLIW processor. As illustrated, processor 102 communicates through north bridge 104 to memory array 106. North bridge 104 includes a memory controller and one or more bridges to other devices. North bridge 104 communicates with one or more south bridges 108 on a standard bus 109, for example, a peripheral component interconnect (PCI) bus. South bridge 108 communicates to one or more input/output (I/O) devices 110 on another standard bus 111, for example, an ISA bus. Additional devices (not shown) can be attached to standard buses 109 and 111.

FIG. 1B illustrates an exemplary prior art multiprocessor computing system architecture 150. Architecture 150 is similar to architecture 100, except that multiple processors 152 communicate through a north bridge 154. Multiple processors 152 can share a common bus (not shown) to north bridge 154 or have individual communication paths as shown. Multiple processors 152 access memory array 106 through a memory controller in north bridge 154. One of the processors 152 is designated as the boot strap processor (BSP) and executes the BIOS to boot the computing system. During the boot process, the other processors 152 are inactive, for example, under a halt condition.

Memory array 106 can consist of several memory slots, populated or unpopulated, for the addition or replacement of memory modules. North bridges 104 and 154 can be programmed to interface to a variety of memory modules. As illustrated, the interface to memory array 106 is shared amongst the memory modules. Thus, if differing memory modules are populated, north bridges 104 and 154 must be programmed to parameters that allow each memory module to operate correctly. An exemplary memory module is illustrated in FIG. 4.

Upon system initialization, the BIOS executing on the boot strap processor initializes memory. Memory initialization can include verifying population of memory modules, verifying proper operation of the memory (no stuck bits), and initializing or clearing the memory to known values. Computer systems can have a large amount of memory, for example 8, 16 and even 32 Gigabytes of memory. Such systems can take several minutes to initialize the memory.

Architecture 150 is commonly used for servers which need extra processing power and have large amounts of memory. The boot strap processor performs all memory testing and clearing during system boot which can take a significant amount of time. Large server systems often take several minutes to boot while the other processors are idle.

To improve BIOS memory initialization time and thus the overall system boot time, some computing systems skip the initialization of the memory to known values. However, modern memory modules include error correction codes (ECC). These codes are used to find and correct memory bit errors. If the memory and ECC are not initialized to known values, extraneous errors remain upon system boot, resulting in an attempt to fix bogus errors and destroying good data. Additionally, large amounts of errors are logged. Thus, the initialization to known values cannot be skipped without causing system reliability problems.

ECC causes additional processing during system operation as well. ECC memory is "scrubbed" periodically during run-time when the computing system is not busy. By stepping through each memory address, errors can be found and corrected, eliminating the opportunities for multiple bit errors to accumulate that can't be corrected. Scrubbing memory improves memory reliability.

SUMMARY

Accordingly, in one embodiment, a system has a plurality of processing nodes, wherein each of the plurality of processing nodes has an assigned portion of system memory such that the assigned portion of system memory of each of the plurality of processing nodes is accessible by the plurality of processing nodes. A technique is presented that allows each of the plurality of processing nodes to perform a memory initialization and test of the processing node's assigned portion of system memory. One of the processing nodes can cause the others of the processing nodes to perform the memory initialization and test process or each processing node can automatically perform the memory initialization and test process.

In another embodiment, one of the plurality of processing nodes is further configured to receive status of the memory initialization and test process from the others of the plurality of processing nodes.

In another embodiment, one of the plurality of processing nodes is configured to first initialize communication links between the plurality of processing nodes and between the plurality of processing nodes and the memory.

In another embodiment, to cause the plurality of processing nodes to perform the memory initialization and test process, one of the plurality of processing nodes is configured to write a register in each of the plurality of processing nodes.

In another embodiment, to cause the plurality of processing nodes to perform the memory initialization and test process, one of the plurality of processing nodes is configured to send a directed start message to each of the plurality of processing nodes.

In another embodiment, to cause the plurality of processing nodes to perform the memory initialization and test process, one of the plurality of processing nodes is configured to send a broadcast start message to all of the plurality of processing nodes.

In another embodiment, each of the plurality of processing nodes has a processor, a memory controller, and a communication interface to at least one other of the plurality of processing nodes.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

According to the present invention, a system and method for improving system boot time is introduced. Utilizing an improved BIOS algorithm, the time required to initialize memory and error correction codes (ECC) to known values is significantly reduced. In an exemplary four processor system, the reduction in time can be as great as or greater than a factor of four. According to the present invention, a boot strap processor (BSP) executes BIOS and distributes the initialization process of memory to multiple processors. Each processor initializes a portion of memory significantly improving memory initialization time by allowing initialization to occur concurrently for multiple memory locations and by eliminating communication time for the BSP to access distant memory. In an exemplary multiprocessor system, memory arrays are distributed such that multiple processing nodes are each designated a portion of the system memory, for example, a specified address space, referred to as the local memory of the processing node. This local memory is accessible by all other processing nodes. Each processing node in the multi-processor system tests and initializes its own local memory.

Figure 1A:
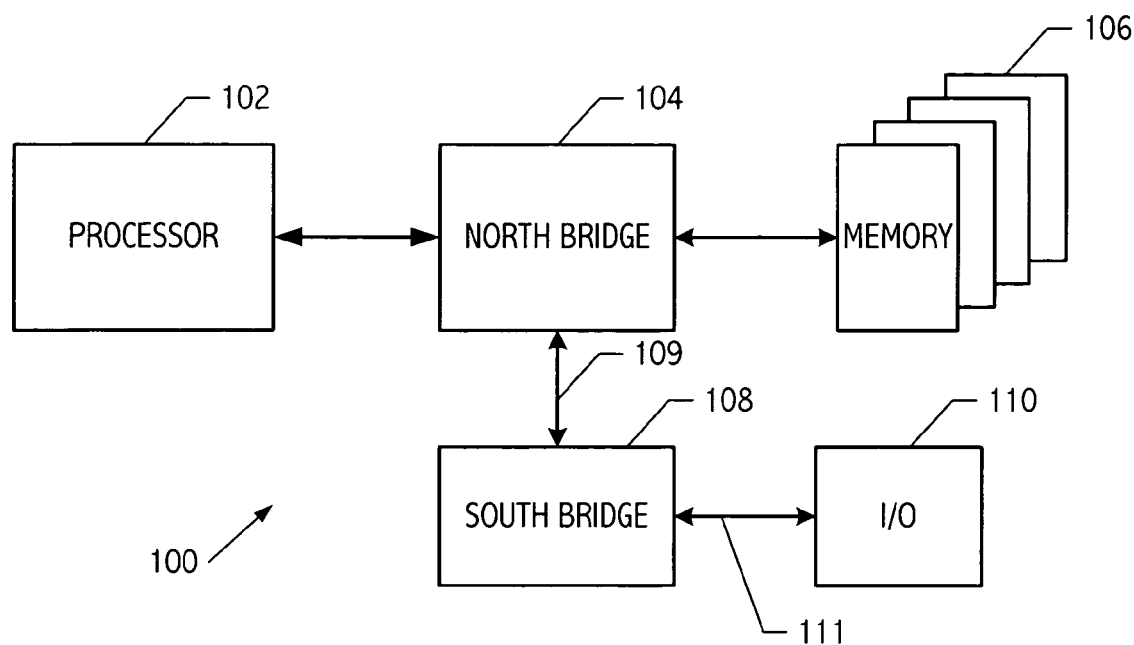
FIGS. 1A–1B illustrate exemplary prior art computing system architectures.
Figure 1B:
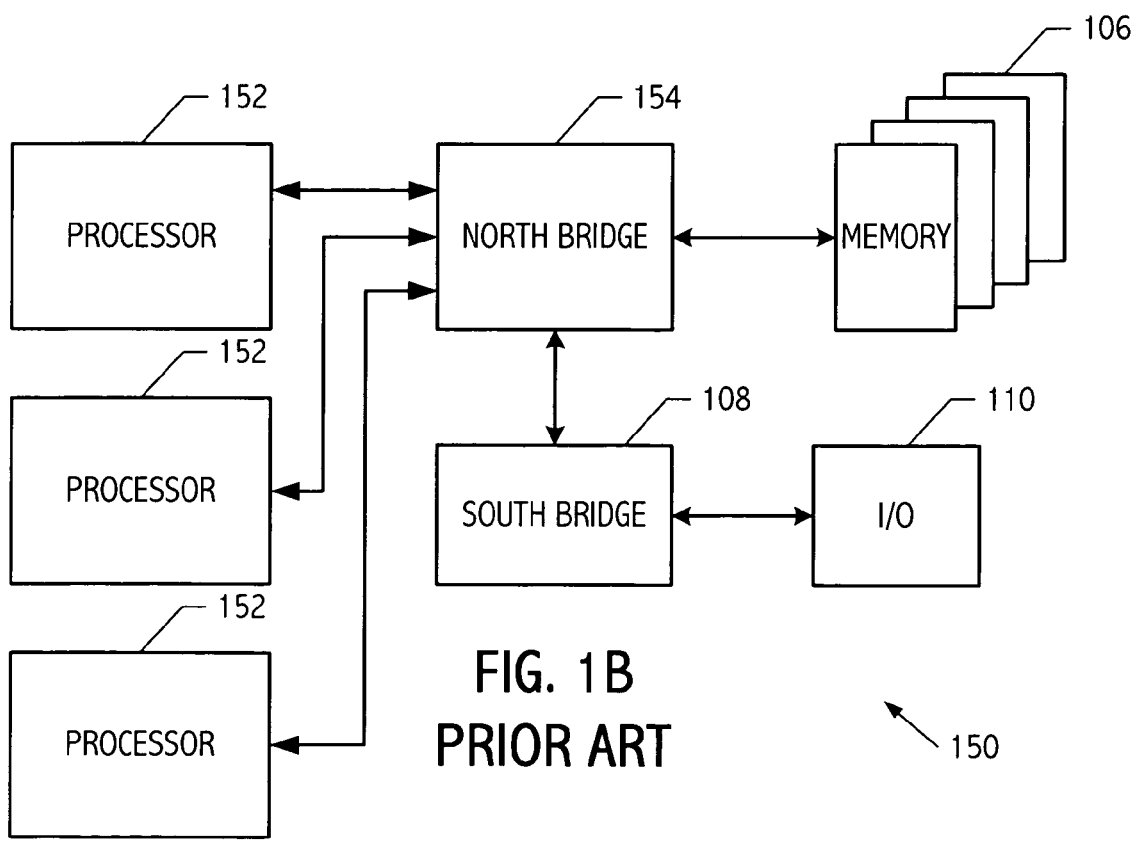
Figure 2:
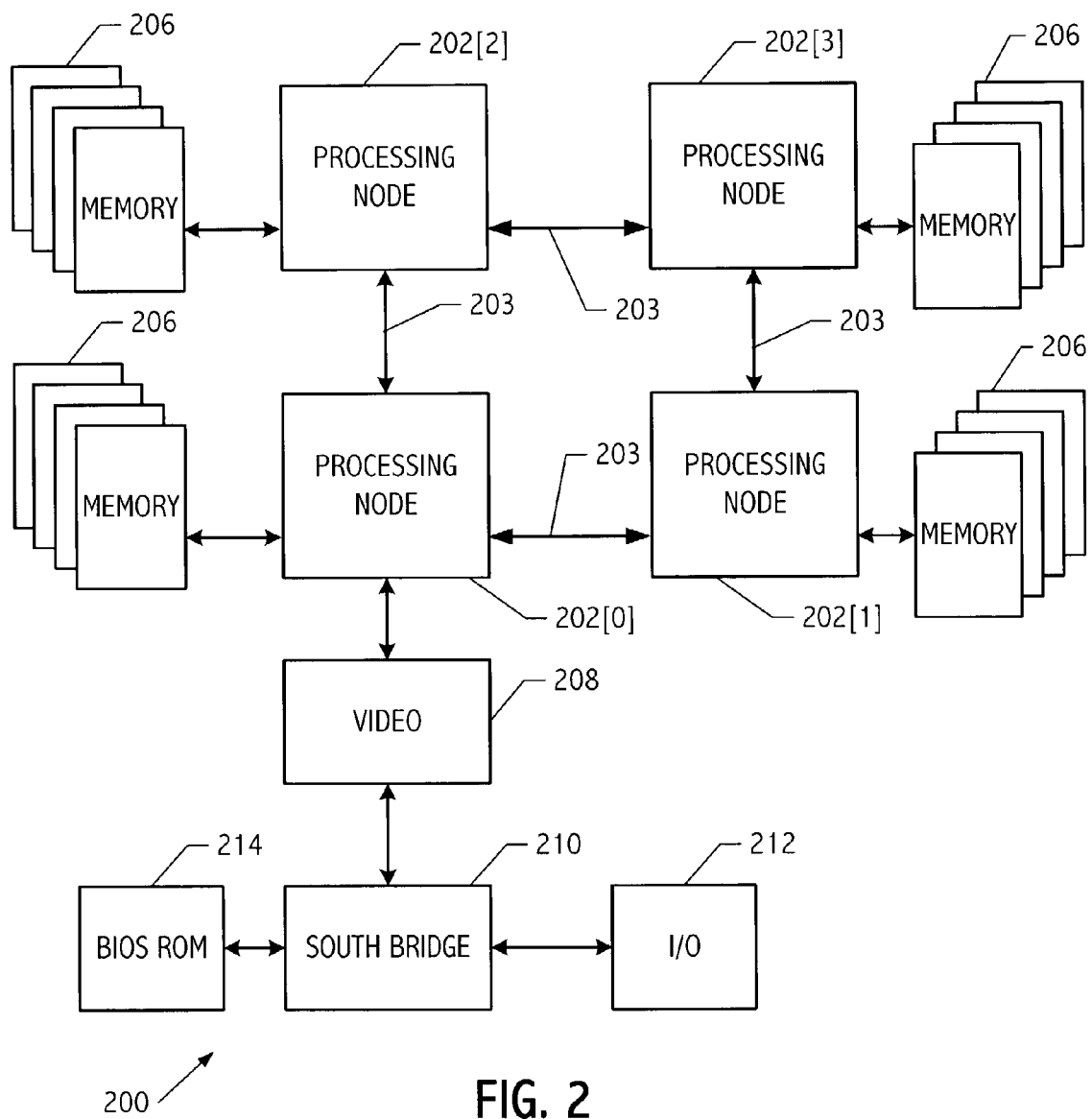
FIG. 2 illustrates an exemplary computing system architecture utilized by an embodiment of the present invention.

FIG. 2 illustrates an exemplary system architecture 200 according to the present invention. System 200 is a multi-processor system with multiple processing nodes 202[0:3] that communicate with each other via links 203. Each of processing nodes 202 includes, for example, a processor, a memory controller, and link interface circuitry. Links 203 can be dual point to point links according to, for example, a split-transaction bus protocol such as the HyperTransport™ (HT) protocol. Links 203 can include a downstream data flow and an upstream data flow. Link signals typically include link traffic such as clock, control, command, address and data information and link sideband signals that qualify and synchronize the traffic flowing between devices. Each memory controller of processing nodes 202 communicates to a memory array 206. The processing nodes 202 and memory arrays 206 are in a "coherent" portion of the system, where all memory transactions are coherent.

A video device 208 can be coupled to one of the processing nodes 202 via another HT link. Video device 208 can be coupled to a south bridge 210 via another HT link. One or more I/O devices 212 can be coupled to south bridge 210. BIOS ROM 214 can be coupled to south bridge 210. Video device 208, south bridge 210 and I/O devices 212 are in a "non-coherent" portion of the system.

Each memory array 206 can consist of several memory slots, populated or unpopulated, for the addition or replacement of memory modules. Each memory slot can provide, for example, 512 Megabytes (Mbytes) of storage capability. System 200 is typically a server system and can have large amounts of memory, for example 32 Gigabytes (GBytes) of storage capability. The memory controller of each processing node 202 can be programmed differently, but must be programmed to interface to the local variety of memory modules coupled to the associated processing node 202.

System 200 can be more complex than shown, for example, additional processing nodes 202 can make up the coherent portion of the system. Additionally, although processing nodes 202 are illustrated in a "ladder architecture," processing nodes 202 can be interconnected in a variety of ways and can have more complex couplings. For example, processing node 202[2] can be coupled to processing node 202[1] via an additional HT link.

Figure 3:
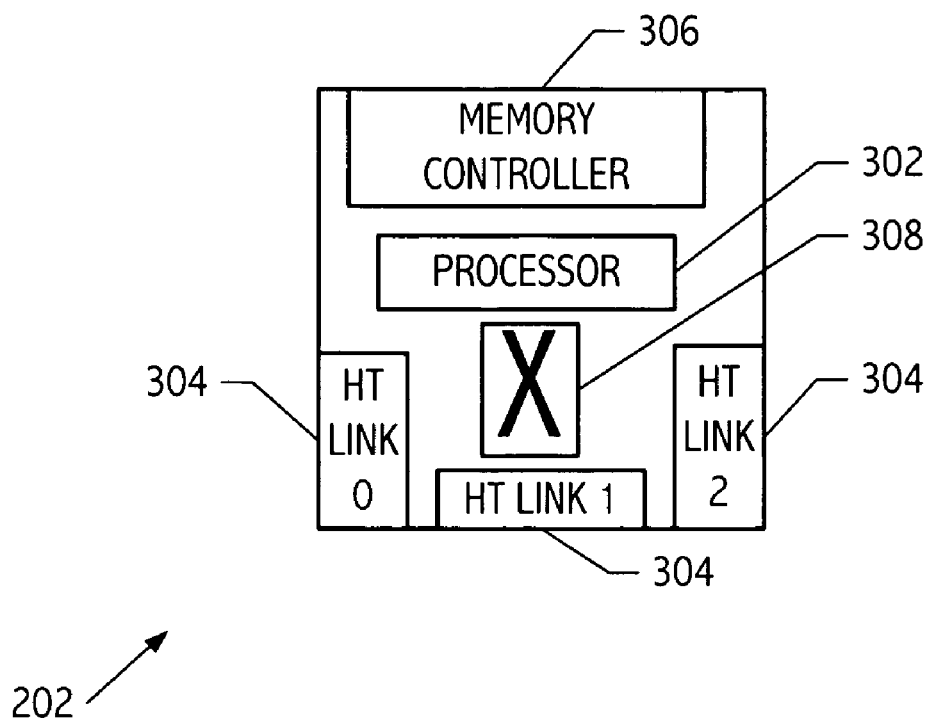
FIG. 3 illustrates an exemplary processing node utilized by an embodiment of the present invention.

FIG. 3 illustrates an exemplary processing node 202 according to the present invention. As illustrated, processing node 202 includes a processor 302, multiple HT link interfaces 304, and a memory controller 306. A crossbar 308 transfers requests, responses and broadcast messages to processor 302 and/or the appropriate HT link interface(s) 304. Transfer of the requests, responses and broadcast messages is directed by multiple configuration routing tables located in each processing node 202 that must be configured by BIOS. Additionally, memory controller 306 contains multiple configuration registers for operational parameters that must be programmed by BIOS.

Figure 4:
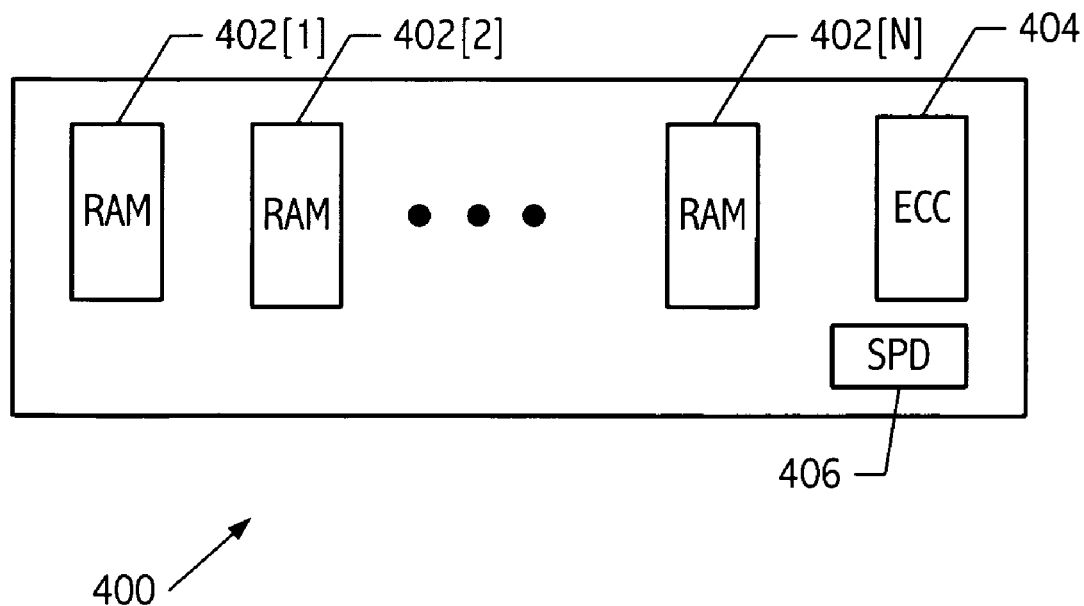
FIG. 4 illustrates an exemplary DIMM (dual inline memory module) utilized by an embodiment of the present invention.

FIG. 4 illustrates an exemplary DIMM (dual inline memory module) 400. Several DIMMs, typically eight, can make up a memory array, for example, memory array 106 or 206. DIMM 400 contains multiple random access memory (RAM) integrated circuits or chips 402[1:N], for example, DDR (double data rate) memory chips. Additionally, DIMM 400 can have an ECC (error correction code) chip 404. ECC chip 404 stores error correction codes that allow memory errors to be found and corrected. Additionally, DIMM 400 can have an SPD (serial presence detect) chip 406. SPD chip 406 contains read only information specifying an operational range of DIMM 400 and other information similar to what one would find in a data sheet. For example, SPD chip 406 identifies memory storage capacity of DIMM 400, operating parameters such as minimum cycle times, CAS latency, and the like.

Upon system initialization, each memory module must be initialized and tested. This can include verifying population of memory modules, verifying proper operation of the memory (no stuck bits), and initializing or clearing the memory to known values. Each memory module can be scrubbed on a periodic basis utilizing ECC to correct any memory errors.

Figure 5:
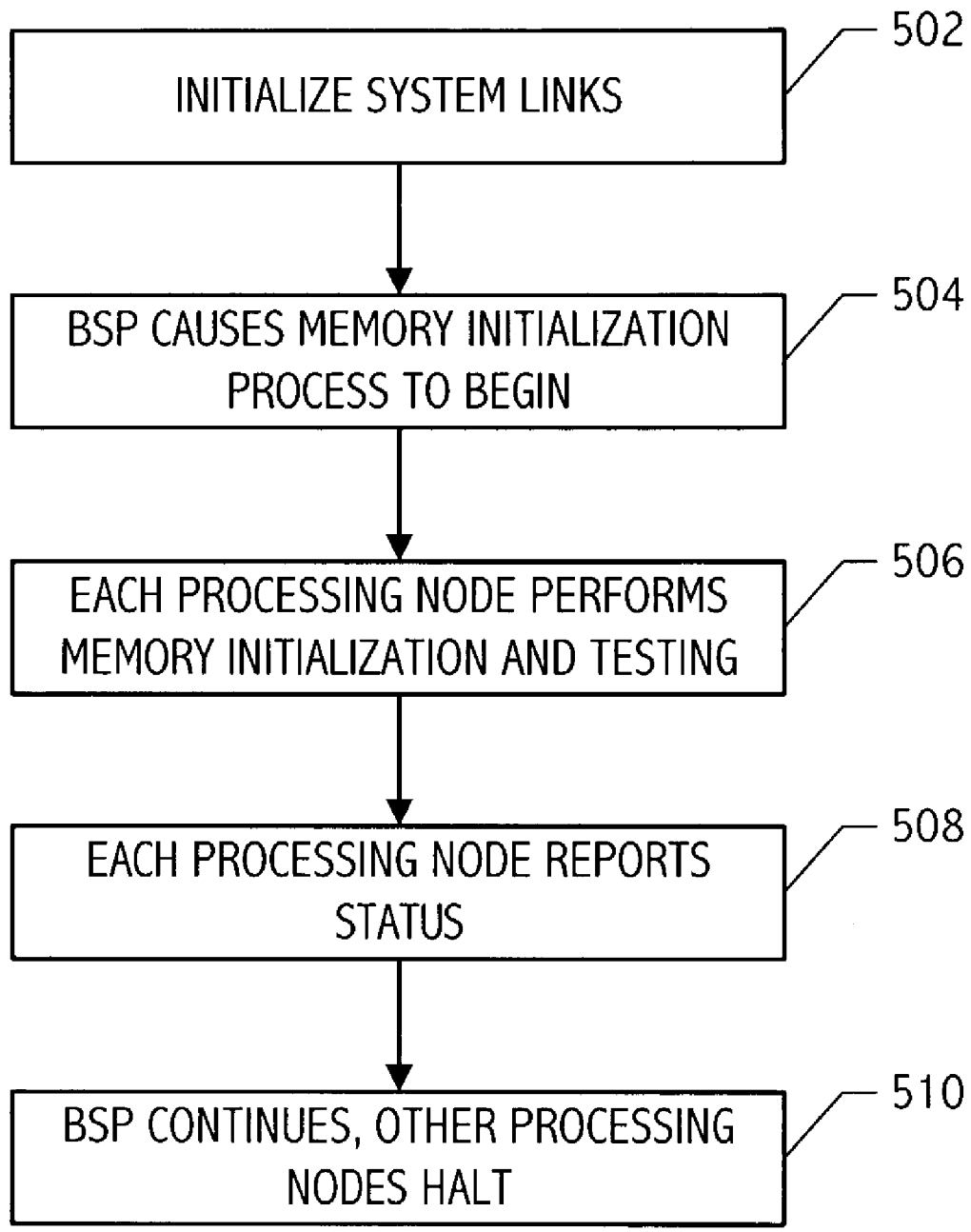
FIG. 5 illustrates a flow diagram of optimized memory initialization and testing according to an embodiment of the present invention.

FIG. 5 illustrates a flow diagram for optimized memory testing and initialization according to an embodiment of the present invention. System links are initialized such that each processing node can communicate to other processing nodes and memory, step 502. This is typically performed by BIOS running on the boot strap processor. Alternatively, in hardwired systems, the processing nodes can be automatically configured to communicate to each other and memory upon system power up.

The processing node designated as the boot strap processor (BSP) causes the memory initialization process to begin, step 504. This can be accomplished in a variety of manners. For example, the BSP can send a start message to each processing node or a broadcast message to all processing nodes. Alternatively, a bit can be written in each processing node indicating the memory initialization and testing process is to begin. Alternatively, a directed interrupt can cause the process to begin. A directed interrupt can occur when code executing on an arbitrary processor writes to one or more registers. The values written can direct one or more processors to take a specific action. For example, the value written can include a node identifier that identifies the "target" of the directed interrupt and a vector that indicates a series of instructions to execute via specifying directly or indirectly an address at which to begin code execution. Next, a hardware mechanism, for example, delivers the message to the target processor. Then the targeted processor begins execution of code specified by the vector.

Each processing node performs memory initialization and testing for a portion of memory, step 506. As illustrated in FIG. 2, each processing node has local memory accessible by all other processing nodes. Thus, by having each processing node initialize and test its own local memory, the process can be completed concurrently and reduce traffic and possible bottlenecks on communication links. This can be accomplished in a variety of manners. For example, each processing node can execute a routine that tests and initializes memory. Alternatively, circuitry inside each processing node's north bridge can automatically test and initialize memory.

Each processing node reports status, step 508. Status reporting can occur, for example, continuously during the memory initialization and test, periodically, or when memory initialization and testing are complete. Additionally, status can be reported in a variety of manners. For example, the boot strap processor can periodically send an "Are you done?" query to each processing node. Alternatively, each processing node can send a message indicating status to the boot strap processor. As another alternative, each processing node can write to local registers or even to the boot strap processor's local memory reporting status similar to the use of semaphores.

After all processing nodes have completed memory initialization and test, the boot strap processor continues with system boot and the other processing nodes halt, step 510.

Figure 6:
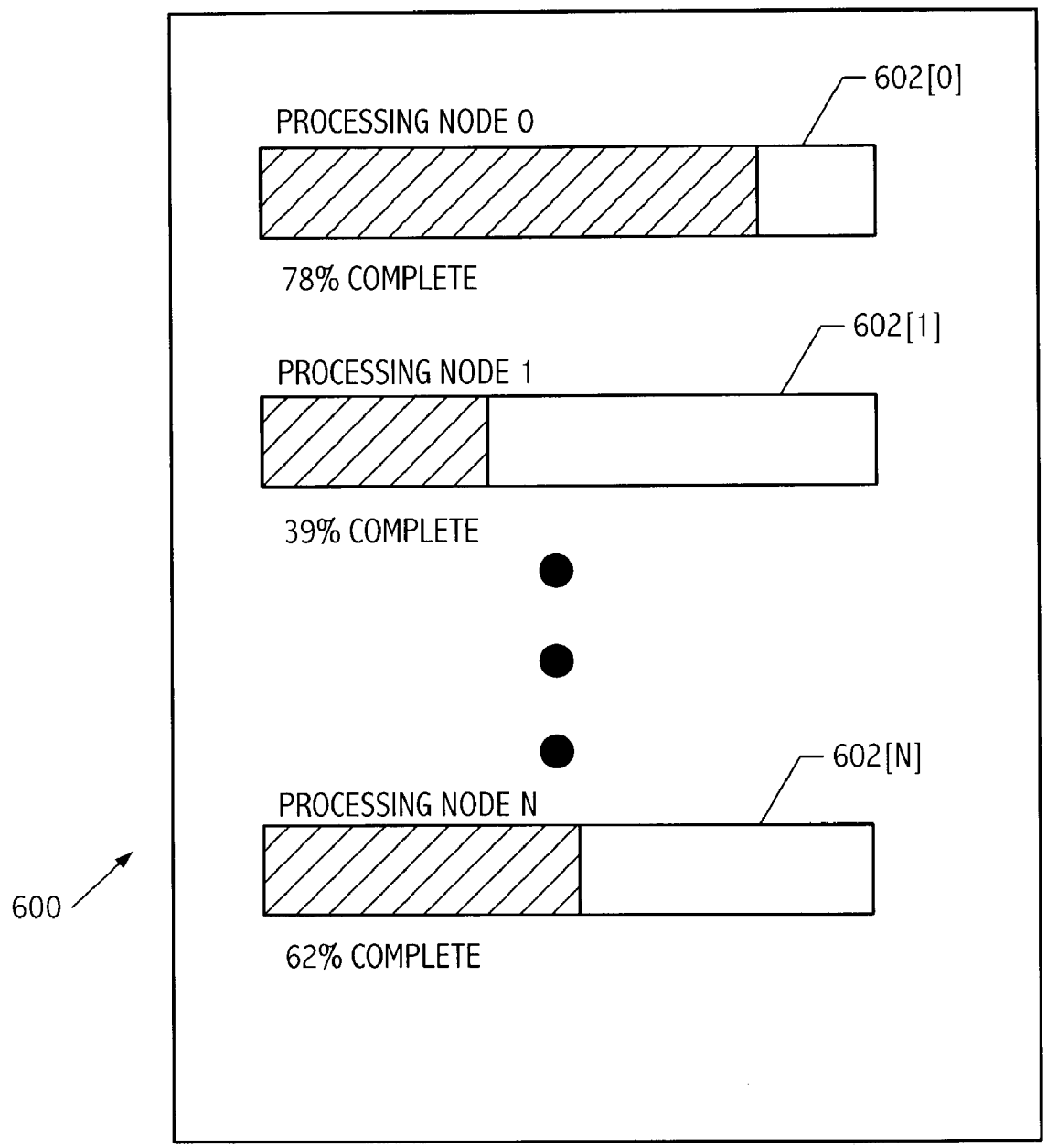
FIG. 6 illustrates an exemplary status reporting mechanism according to an embodiment of the present invention.

FIG. 6 illustrates an exemplary status reporting mechanism 600 according to an embodiment of the present invention. Using periodic status reporting from the various processing nodes, the boot strap processor can create a display for a computer screen depicting the current status, for example, displays 602[0:N] depicting a percent completion of the memory initialization and testing process on each processing node and/or overall.

By having each processor test and initialize a portion of memory, system boot can complete significantly faster. Additionally, each processing node can scrub a portion of memory correcting errors when idle.

Although the present invention has been described as having each processing node initialize and test local memory, having one or more of the processing nodes share in the initialization and testing of the memory can significantly improve boot time.

In an alternate embodiment, the boot strap processor can test and initialize a portion of memory prior to the other processing nodes testing and initializing portions of memory. This pre-initialized and tested portion of memory can be utilized for status reporting by other processing nodes.

In an alternate embodiment, rather than the memory initialization process being initiated by the BSP, each processing node can be pre-programmed to automatically initialize a designated portion of system memory.

Flow 500 can be utilized to initialize and test system memory in an improved manner according to some embodiments of the invention. It is appreciated that operations discussed herein can include directly entered commands by a computer system user, but the preferred embodiment includes steps executed by software modules. The functionality of step referred to herein may correspond to the functionality of modules or portions of modules. In addition to software modules, the above flows or portions of flows can be implemented as application instructions.

The operations referred to herein may be modules or portions of modules (e.g., software, firmware, or hardware modules). For example, the software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into sub-modules to be executed as multiple computer processes. Moreover, alternative embodiments may combine multiple instances of a particular module or sub-module. Furthermore, those skilled in the art will recognize that the operations described in exemplary embodiments are for illustration only. Operations may be combined or the functionality of the operations may be distributed in additional operations in accordance with the invention.

Thus, the flows described herein, the operations thereof and modules therefore may be executed on a computer system configured to execute the operations of the flows and/or may be executed from computer-readable media. The flows may be embodied in a machine-readable and/or computer-readable medium for configuring a computer system to execute the flows. Thus, the software modules may be stored within and/or transmitted to a computer system memory to configure the computer system to perform the functions of the module.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method comprising:
   causing a plurality of processing nodes to perform a memory initialization and test process, wherein each of the plurality of processing nodes performs the memory initialization and test process on a corresponding local memory, wherein the corresponding local memory forms at least a portion of a system memory and is accessible by the plurality of processing nodes;
   wherein each of the plurality of processing nodes comprises a processor, a memory controller, and a communication interface to at least one other of the plurality of processing nodes;
   wherein the causing the plurality of processing nodes to perform the memory initialization and test process comprises one of the plurality of processing nodes sending a broadcast start message to all of the plurality of processing nodes.

2. The method, as recited in claim 1, further comprising:
   first initializing communication links between the plurality of processing nodes and between each of the plurality of processing nodes and the corresponding local memory.

3. The method, as recited in claim 1, wherein the causing the plurality of processing nodes to perform the memory initialization and test process comprises writing to a register in each of the plurality of processing nodes.

4. The method, as recited in claim 1, wherein to perform the memory initialization and test process, each of the plurality of processing nodes executes a software routine.

5. The method, as recited in claim 1, wherein circuitry in a memory controller in each of the plurality of processing nodes automatically causes the memory initialization and test process to be performed during system initialization.

6. The method, as recited in claim 1, further comprising:
   receiving, by a bootstrap processor, status of the memory initialization and test process from others of the plurality of processing nodes.

7. The method, as recited in claim 6, wherein the receiving status of the memory initialization and test process comprises individual ones of the plurality of processing nodes sending a status message to the bootstrap processor.

8. The method, as recited in claim 6, wherein the receiving status of the memory initialization and test process comprises reading a register by the bootstrap processor.

9. The method, as recited in claim 6, wherein the receiving status of the memory initialization and test process comprises reading a location in the system memory by the bootstrap processor.

10. The method, as recited in claim 6, wherein the status of the memory initialization and test process is displayed on a screen of a computing system by the bootstrap processor.

11. The method, as recited in claim 1, wherein an individual one of the plurality of processing nodes accesses its corresponding local memory simultaneously with another of the plurality of processing nodes accessing its corresponding local memory.

12. The method, as recited in claim 1, wherein each of the plurality of processing nodes is coupled to its corresponding local memory by a distinct communication link.

13. A computer system comprising:
    a plurality of processing nodes, each of the processing nodes comprising a processor, a memory controller, and a communication interface to at least one other of the plurality of processing nodes,
    wherein each of the plurality of processing nodes has an assigned portion of system memory, wherein the assigned portion of system memory of each of the plurality of processing nodes is local to the processing node and is accessible by the plurality of processing nodes;
    wherein one of the plurality of processing nodes is configured to cause others of the plurality of processing nodes to perform a memory initialization and test process of the assigned portion of system memory of the respective processing node;
    wherein to cause the plurality of processing nodes to perform the memory initialization and test process the one of the plurality of processing nodes is further configured to send a broadcast start message to all of the plurality of processing nodes.

14. The computer system, as recited in claim 13, wherein the one of the plurality of processing nodes is further configured to receive status of the memory initialization and test process from the others of the plurality of processing nodes.

15. The computer system, as recited in claim 13, wherein the one of the plurality of processing nodes is further configured to first initialize communication links between the plurality of processing nodes and communication links between the plurality of processing nodes and the system memory.

16. The computer system, as recited in claim 13, wherein an individual one of the plurality of processing nodes accesses its corresponding local memory simultaneously with another of the plurality of processing nodes accessing its corresponding local memory.

17. A computer system comprising:
- a plurality of processing nodes, each of the processing nodes comprising a processor, a memory controller, and a communication interface to at least one other of the plurality of processing nodes,
- wherein each of the plurality of processing nodes has an assigned portion of system memory, wherein the assigned portion of system memory of each of the plurality of processing nodes is local to the processing node and is accessible by the plurality of processing nodes;
- wherein each of the plurality of processing nodes is configured to perform a memory initialization and test process of the assigned portion of system memory of the respective processing node;
- wherein to cause the plurality of processing nodes to perform the memory initialization and test process one of the plurality of processing nodes is further configured to send a broadcast start message to all of the plurality of processing nodes.

18. The computer system, as recited in claim 17, wherein individual ones of the plurality of processing nodes are further configured to report status of the memory initialization and test process to a bootstrap processor.

* * * * *